(12) United States Patent
Lin et al.

(10) Patent No.: US 6,331,996 B1
(45) Date of Patent: Dec. 18, 2001

(54) CHANNEL SYNCHRONIZATION AND IMPULSE SOUNDING IN THE PRESENCE OF FREQUENCY OFFSET

(75) Inventors: Jenn-Shing Lin, Freehold; Richard Rogoszewicz, Voorhees; Jin-Der Wang, Ocean City, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/086,197

(22) Filed: May 28, 1998

(51) Int. Cl.$^7$ ............................. H04L 27/30; H04L 7/00
(52) U.S. Cl. .................... 375/130; 375/140; 375/367; 375/150
(58) Field of Search ........................ 375/142, 145, 375/149, 150, 376, 200, 1, 206, 208; 455/29

(56) References Cited

U.S. PATENT DOCUMENTS

| | | | |
|---|---|---|---|
| 4,351,064 | * 9/1982 | Ewanus | 455/29 |
| 4,759,034 | * 7/1988 | Nagazumi | 375/1 |
| 5,359,625 | * 10/1994 | Vander Mey et al. | 375/1 |
| 5,467,367 | * 11/1995 | Izumi et al. | 375/206 |
| 5,675,608 | * 10/1997 | Kim et al. | 375/208 |
| 5,999,561 | * 12/1999 | Naden et al. | 375/206 |
| 6,055,265 | * 4/2000 | Kim | 375/150 |

* cited by examiner

Primary Examiner—Stephen Chin
Assistant Examiner—Tony Al-Beshrawi
(74) Attorney, Agent, or Firm—Howard R. Popper

(57) ABSTRACT

A known training sequence of binary, pseudo random signals, PN, is received over the channel and correlated with a modified pseudo random sequence $PN^{-1}$ in which the zeros of the known sequence PN have been mapped to −1. A transform of the correlator output will be observed to contain strong tones that indicate the degree of frequency offset. To facilitate synchronization in the presence of an unknown amount of frequency offset, the received signals may be rectified and the correlation step performed with the absolute value of the incoming signal to obtain new output samples. When the frequency offset is small its measurement is facilitated by modulating the incoming signals with a known, comparatively large frequency offset, before the correlation step to make sure that the overall frequency offset occurs around a frequency that is an integral multiple of the symbol rate divided by the number of symbols in the pseudo random sequence. After being compensated for the frequency offset, the received synchronization/sounding signal is used to sound the channel impulse response.

14 Claims, 6 Drawing Sheets

C1-C2

CHANNEL SYNCHRONIZATION AND IMPULSE SOUNDING IN THE PRESENCE OF FREQUENCY OFFSET

FIELD OF THE INVENTION

This invention relates to data communications over a channel and, more particularly, to obtaining channel impulse response in the presence of frequency offset between the receiver and transmitter.

BACKGROUND OF THE INVENTION

Before a channel carrying digital information can be equalized by ascertaining its impulse response, it is necessary to synchronize the receiver to the frequency of the signal being transmitted. If the local oscillator at the receiver is not precisely tuned to the transmitted frequency a form of impairment, called frequency offset, occurs. Since channel equalization is different for different frequencies, the channel cannot be accurately equalized because of such offset. In order to achieve synchronization, it is customary for the transmitter to send a pseudo-random sequence until the receiver's local oscillator achieves lock-in to the transmitted frequency. Once precise synchronization has been achieved, a further pseudo-random sequence is sent in order for the receiver to ascertain the impulse response of the channel so that the channel can be equalized. However the need to use two transmission sequences, one for channel synchronization and another for ascertaining the channel's impulse response increases receiver overhead processing. It would be advantageous to be able to obtain receiver synchronization and channel response with the use of a single transmitted sequence.

SUMMARY OF THE INVENTION

In accordance with the principles of our invention, the same training sequence can be used to achieve synchronization with the transmitted symbols and also to ascertain the channel's impulse response despite an initial frequency offset. A predetermined binary sequence of pseudo random signals (PN) is transmitted over the channel and is correlated at the receiver with a modified version of the sequence ($PN^{-1}$) in which the zeros of the known sequence PN have been mapped to $-1$. The use of these sequences has the important property that the product of training sequence $A(f)$ and impulse response of the composite channel and correlator $B(f)$ will be constant over the transmission band so that the result is an exact copy of the channel impulse response. In addition, a Fourier or other suitable transform of the correlator output will exhibit strong tones that indicate the degree of frequency offset initially present so that the signal may be accurately synchronized at the receiver. After the received signal has been compensated for frequency offset, the received signal is used to ascertain the channel's impulse response. Once the sounded channel impulse response is obtained at the receiver, a sub-optimal coefficient set for a decision feedback equalizer is computed. The sub-optimal solution is then modified to obtain a final solution for the equalizer which, with the proper set of coefficients installed, may be used to recover user data.

BRIEF DESCRIPTION OF THE DRAWING

The foregoing and other objects and features of the present invention may become more apparent when the ensuing description is read together with the drawing, in which:

FIG. 7(a) shows a circuit for compensating for the effects of frequency offset in the baseband signal while

GENERAL DESCRIPTION

Figure 1:
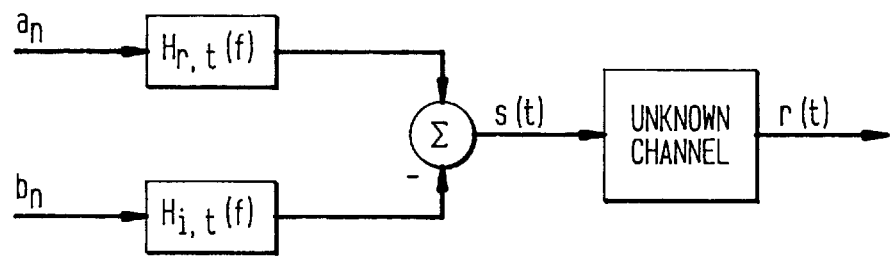
FIG. 1 is a block diagram of a circuit for applying a digitally generated carrier amplitude/phase modulated (CAP) signal to a transmission channel.

Channel impulse sounding is a conventional technique in which a known training signal, $A(f)$, is generated and shaped so that its spectrum is substantially confined to the transmission band of the channel whose exact frequency response is to be determined. At the transmitter, a digital complex pass-band transmitter filter is used to shape the signal so that its spectrum is confined within the transmission bandwidth. The bandwidth of the transmitting filter is a multiple of the symbol rate and is centered about a frequency such that the training signal's spectrum will not exceed the channel's nominal passband. The digitally filtered signal is converted to an analog signal by a digital-to-analog converter. The analog signal is filtered again by an analog low-pass or band-pass filter to eliminate the alias signal. If needed, the signal is then up-converted to a carrier frequency at the RF transmitter and transmitted over a wireless channel. At the receiver side, the signal is first down-converted to a signal at the centered frequency. The down-converted signal is sampled at a multiple of the symbol rate. The sounded channel impulse response is obtained at the correlator output and used to compute the inphase and quadrature coefficients for equalization.

The frequency response of the training signal when it is received over the channel is determined by $A(f) \cdot H_t(f) \cdot H_c(f) \cdot H_u(f)$ where $H_t(f)$, $H_c(f)$, and $H_u(f)$ are, respectively, the frequency responses of the transmitter (including the RF up-converter), channel, tuner (RF down-converter). After the received signal is correlated, it yields a frequency response of:

$$T(f)=A(f)\cdot H_t(f)\cdot H_c(f)\cdot H_u(f)\cdot B(f) \quad (Eq.\ 1)$$

where $B(f)$ is the frequency responses of the correlator. If $A(f)\cdot B(f)$ equals to a constant L over the transmission band, we have:

$$T(f)=A(f)\cdot B(f)\cdot H_t(f)\cdot H_c(f)\cdot H_u(f)=L\cdot H(f) \quad (Eq.\ 2)$$

where $H(f)$ is the overall transfer function. Since the correlated signal has a response that is proportional to the channel response, the correlated signal indeed contains the channel information. If the channel is corrupted by noise, then $$T(f) = L\cdot H(f) + \sqrt{L\cdot N(f)},$$

where $N(f)$ is the channel noise power spectrum and L is the processing gain as described above. The ratio $L\cdot|H(f)^2|/N(f)$, integrated over the transmission band, defines the channel estimated signal-to-noise ratio in the channel estimate. The larger the processing gain, the better protection to the estimated channel characteristics from noise.

In accordance with our invention, a binary Pseudo Random (PN) is used as the training sequence. A pseudo random sequence of 127 symbols can be obtained by generating the polynomial is given by:

$$h(x)=x^7+x+1 \quad (Eq.\ 3)$$

The Pseudo Random sequence, each bit having a value 1 or 0, is transmitted over the channel and correlated at the receiver. While it is a common practice to use, at the receiver, an identical copy of the transmitted Pseudo Random sequence as the coefficient of the correlator, it is an aspect of our invention that we use a modified version in order to obtain the special property, mentioned above, that will make $A(f)\cdot B(f)=L$, a constant, over the transmission band. The Pseudo Random sequence used at the receiver as the coefficient of the correlator is modified by mapping the zeros in the original transmitted sequence to −1. There are two effects of this modification, (a) the resulting frequency response of the correlator has a D.C attenuation and thus minimizes the RF D.C effect, (b) the transmitted Pseudo Random sequence, when correlated with the modified sequence, results in an exact copy of the channel impulse response at the correlator output. (It is worth noting that if the received sequence is correlated with an identical copy of the original sequence the resulting channel impulse response includes an average or "DC" component determined by the length of the training sequence. Furthermore, if the received sequence were correlated with the original training sequence PN instead of with the modified sequence $PN^{-1}$, the average value component of the RF would give rise to a tone in the frequency response spectrum having an amplitude that was 127 times or 20·log 127 dB higher than other frequency components, complicating the synchronization procedure.

Passband CAP Signal Generation

FIG. 1 shows the generation of a passband Carrier AM/PM (CAP) modulated signal, a variation (a close relative) of the Quadrature Amplitude Modulated (QAM) signal. The passband CAP signal, with a center frequency $f_c$ and a symbol rate 1/T, can be expressed as:

$$s(t) = \text{Re}\left[\sum_n A_n e^{-j\omega_c nT} h_b(t-nT) e^{j\omega_c t}\right] \quad (Eq.\ 4)$$

where $A_n=a_n+jb_n$ is the signal to be transmitted, $a_n$ and $b_n$ are inphase and quadrature components, respectively, $\omega_c=2\pi f_c$ and $h_b(t)$ is the baseband equivalent transmitter pulse shaping filter response. We can also rewrite Eq. 4 as:

$$s(t) = \text{Re}\left[\sum_n A_n h_b(t-nT) e^{j\omega_c(t-nT)}\right] \quad (Eq.\ 5)$$

$$= \text{Re}\left[\sum_n A_n h_p(t-nT)\right]$$

where $h_p(t)=h_b(t-nT)e^{j\omega_c(t-nT)}$ is a complex passband equivalent transmitter pulse shaping filter. After passing through an unknown channel, the signal received can be expressed as:

$$r(t) = \text{Re}\left[\sum_n A_n h_r(t-nT) e^{j\omega_c(t-nT)}\right] \quad (Eq.\ 6)$$

$$= \text{Re}\left[\sum_n A_n H_r(t-nT)\right]$$

where $$H_r(t)=h_p(t)\otimes h_c(t)=h_r(t)\cdot e^{j\omega_c t}=(h_{r,r}(t)+jh_{r,i}(t))\cdot e^{j\omega_c t} \quad (Eq.\ 7)$$

where '$\otimes$' denotes convolution. Note that $h_{r,i}(t)$ goes to zero if the overall passband channel has a symmetric frequency response. According to Eqs. 4 and 5, the received signal can also be expressed as:

$$r(t) = \quad (Eq.\ 8)$$
$$\sum_n a_n h_{r,r}(t-nT)\cos(\omega_c(t-nT)) - a_n h_{r,i}(t-nT)\sin(\omega_c(t-nT)) -$$
$$\sum_n b_n h_{r,r}(t-nT)\sin(\omega_c(t-nT)) + b_n h_{r,i}(t-nT)\cos(\omega_c(t-nT))$$

Passband Sounding Signal and Channel Characterization

The synchronization/sounding signal is composed of the binary Pseudo Random Sequence PN which, because of its finite length, is advantageously repeated an odd plurality (e.g., three) times so that the middle sequence will be the most useful. The baseband synchronization/sounding signal only has the inphase component, i.e., $b_n=0$. The passband synchronization/sounding signal can be easily generated by setting $b_n$ in Eq. 5 to zero.

At the receiver, the synchronization/sounding signal is correlated with a single copy of the modified Pseudo Random Sequence $PN^{-1}$. The received passband synchronization/sounding signal after the passband channel is given by setting $b_n$ in Eq. 8 to zero.

$$r(t) = \quad (Eq.\ 9)$$
$$\sum_n a_n h_{r,r}(t-nT)\cos(\omega_c(t-nT)) - a_n h_{r,i}(t-nT)\sin(\omega_c(t-nT))$$

where $a_n$ represents one of the PN symbols. We express the above equation in a more informative form as $$r(t)=P(t)\otimes[(h_{r,r}(t)\cos\omega_c t)-(h_{r,i}(t)\sin\omega_c t)] \quad (Eq.\ 10)$$

where $$P(t) = \sum_n a_n \delta(t-nT),$$

represents the three binary sounding Pseudo random sequences PN. When the passband sounding signal is correlated at the receiver, the result is given by:

$(P(t) \otimes [(h_{r,r}(t)\cos \omega_c t) - (h_{r,i}(t)\sin \omega_c t)]) \otimes P^{-1}(t)$ (Eq. 11)

where $P^{-1}(t)$ represents the modified Pseudo Random Sequence and only has one single sequence. Mathematically rearranging the above equation yields $P^{-1}(t) \otimes P(t) \otimes [(h_{r,r}(t)\cos \omega_c t) - (h_{r,i}(t)\sin \omega_c t)]$ (Eq. 12)

Figure 2A:
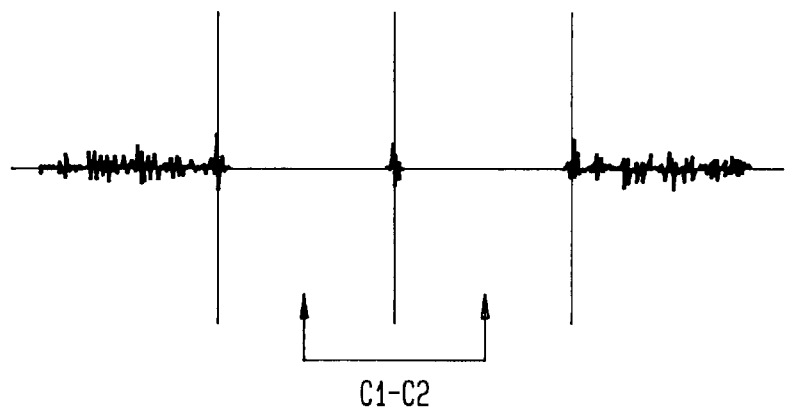
FIGS. 2(a), (b), (c) shows waveforms resulting from correlating a pseudo-random sequence (PN) received over the channel of FIG. 1 with a modified pseudo-random sequence ($PN^{-1}$) in the presence of various degrees of frequency offset.

Since $$P^{-1}(t) \otimes P(t) = L \cdot \sum_n \delta(t-nT),$$

the above equation yields $$L \cdot \sum_n \delta(t-nT) \otimes [(h_{r,r}(t)\cos\omega_c t) - (h_{r,i}(t)\sin\omega_c t)] = \quad \text{(Eq. 13)}$$

$$L \cdot \sum_n [h_{r,r}(t-nT) \cdot \cos(\omega_c(t-nT)) -$$

$$h_{r,i}(t-nT) \cdot \sin(\omega_c(t-nT))]$$

where L is the correlation (processing) gain, and the term in the summation denoted by $[h_{r,r}(t-nt)\cos(\omega_c(t-nT))-(h_{r,i}(t-nT)\sin(\omega_c(t-nT))]$ is the passband channel impulse response. The output of the correlator is shown in FIG. 2(a), where the frequency offset is zero. Since the transmitted training sequence PN is repeated three times, only the center copy has the circular property and thus produces the exact channel impulse response. FIG. (2a) shows the results of convolving the three PN sequences received over the channel with a single copy of the modified pseudo random sequence $PN^{-1}$ when there is zero frequency offset. Since $$P^{-1}(t) \otimes P(t) = L \cdot \sum_n \delta(t-nT),$$

the three sequences give rise to the three delta function responses shown. The correlation gain, L–(length of PN +1)/2. In the illustrative example where PN has 127 symbols, L=64. The central portion of the correlator output indicated at C1–C2 in FIG. 2(a) is taken as the channel impulse response.

Synchronization and Channel Sounding with Frequency Offset

If the channel sounding is corrupted by a frequency offset $\Delta\omega$, the received sounding signal will be:

$$r(t) = \text{Re}\left[\sum_n A_n h_r(t-nT)e^{j\omega_c(t-nT)}e^{j\Delta\omega t}\right] \quad \text{(Eq. 14)}$$

$$= \text{Re}\left[\sum_n A_n e^{j\Delta\omega T} h_r(t-nT)e^{j\omega'_c(t-nT)}\right]$$

-continued $$= \text{Re}\left[\sum_n A_n e^{j\Delta\omega T} H'_r(t-nT)\right]$$

where $\omega'_c = \omega_c + \Delta\omega$ and $H'_r(t)$ is defined as:

$H'_d(t) = h_r(t) \cdot e^{j\omega'_c t} = (h_{r,i}(t) + jh_{r,i}(t)) \cdot e^{j\omega'_c t}$ (Eq. 15)

If we only consider synchronization/sounding signal, i.e., $b_n=0$, the received signal can be expressed as:

$$r(t) = \sum_n a_n\cos(\Delta\omega nT)[h_{r,r}(t-nT)\cos(\omega'_c(t-nT)) - \quad \text{(Eq. 16)}$$

$$h_{r,i}(t-nT)\sin(\omega'_c(t-nT))] - \sum_n a_n \sin(\Delta\omega nT)$$

$$[h_{r,r}(t-nT)\sin(\omega'_c(t-nT)) + h_{r,i}(t-nT)\cos(\omega'_c(t-nT))]$$

Finally, the correlator output is:

$P^{-1}(t) \otimes P(t)\cos(\Delta\omega nT) \otimes [(h_{r,r}(t)\cos \omega'_c t) - (h_{r,i}(t)\sin \omega'_c t)]$
$-P^{-1}(t) \otimes P(t)\sin(\Delta\omega nT) \otimes [(h_{r,r}(t)\sin \omega'_c t) + (h_{r,i}(t)\cos \omega'_c t)]$ (Eq. 17)

Figure 2B:
Figure 2C:
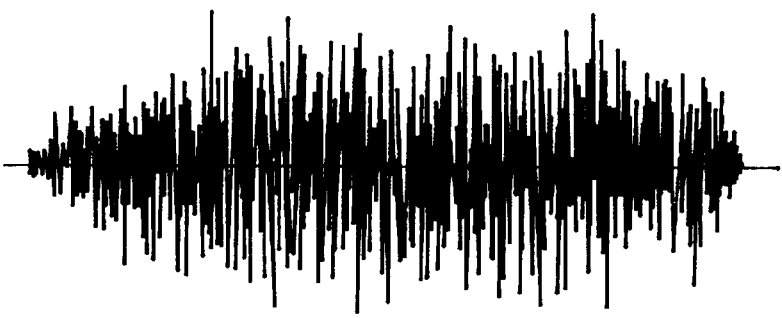
Figure 3A:
FIGS. 3(a), (b), (c) shows the power spectra and related channel impulse response of the correlator output for passband signals with no frequency offset.
Figure 3B:
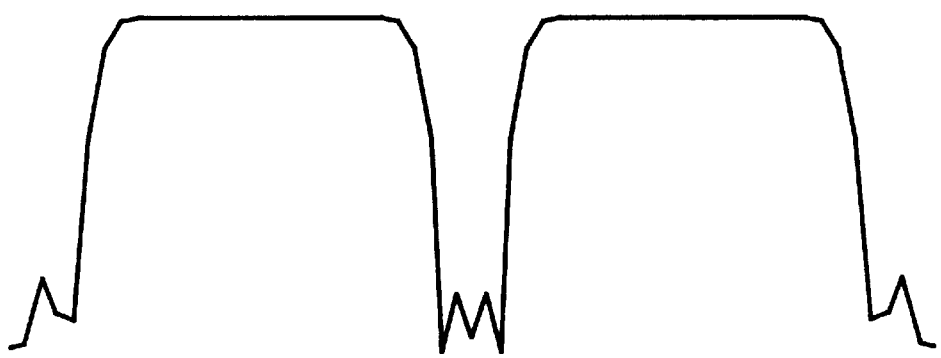

FIGS. 2(b) and 2(c) show the result of convolving the three pseudo random sequences received over the channel with a single copy of the modified pseudo random sequence $PN^{-1}$ for various amounts of frequency offset, $\Delta\omega$. The power spectrum of the correlator output (with zero frequency offset) is shown in FIG. 3(a). FIG. 3 is obtained by taking a fast Fourier transform (FFT) of the correlator output. When there is zero frequency offset, taking the Fourier transform of the central portion of the correlator output, FIG. 2(a), yields the channel impulse response, FIG. 3(b).

Synchronization in the Presence of a Frequency Offset

When the frequency offset is zero, the processed synchronization/sounding signal at the correlator output yields a distinctive pattern that can be used for reliable synchronization as well as for sounding the channel impulse response that is needed for equalizing user data. Two methods are described to synchronize the synchronization/sounding signal and to detect the frequency offset for passband and baseband signals when the synchronization/sounding signal is impaired by frequency offset.

Figure 4A:
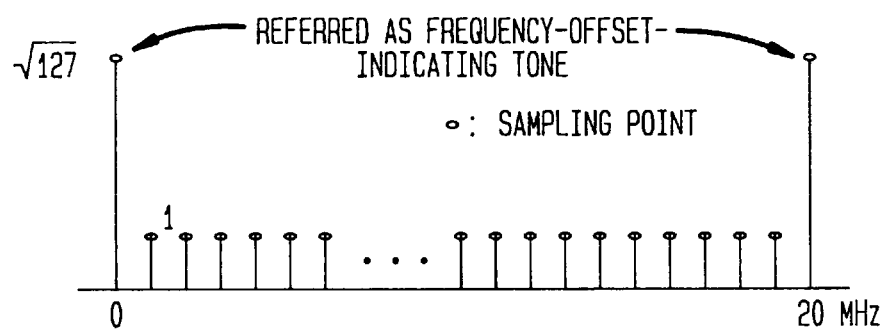
FIGS. 4(a), (b), (c) shows the frequency response of a pseudo-random and modified pseudo-random sequences.
Figure 4B:
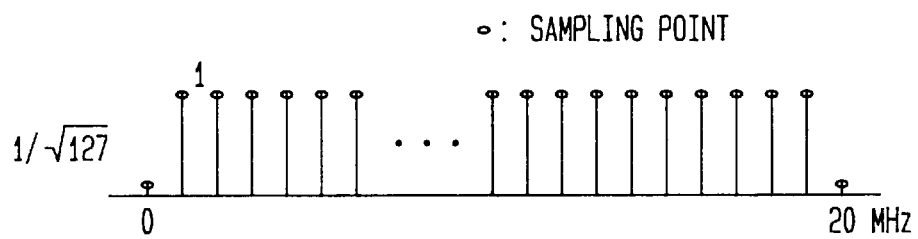

In FIG. 4(a) we show the frequency responses of an illustrative PN sequence of a length of 127 symbols and in FIG. 4(b) that of a modified sequence $PN^{-1}$. To represent the sampling rate at three times symbol rate (illustratively 20 mHz) two zeros are inserted between every two PN symbols. In the illustrative embodiment, we use N=3×127 points of Discrete Fourier Transform (DFT) to construct the frequency response of the PN and the modified PN (correlator) sequences. Since two zeros are inserted between every two PN symbols, the frequency response expands over a range of 60 MHz which is three times the 20 MHz symbol rate. Since the frequency responses of PN and modified PN sequences repeat at every 20 MHz, we only consider their frequency responses within 20 MHz bandwidth as shown in FIG. 4(a) and (b), respectively. Every sampling point occurs at (n/127)·20 MHz, where n=0, 1 . . . , 126. It is worth of noting that the transmitted PN sequence has a strong "DC" component, and thus there is a strong tone repeated at every 20 MHz. This strong tone has a power density that is $\sqrt{127}$ times higher than the rest, which we refer to as frequency-offset-indicating tones (as will become clear, those tones can be used to estimate frequency offset). On the other hand, the modified PN sequence has a weak DC component, and thus there is a weak tone with power density $1/\sqrt{127}$ times lower than the rest and also repeated at every 20 MHz.

Figure 5A:
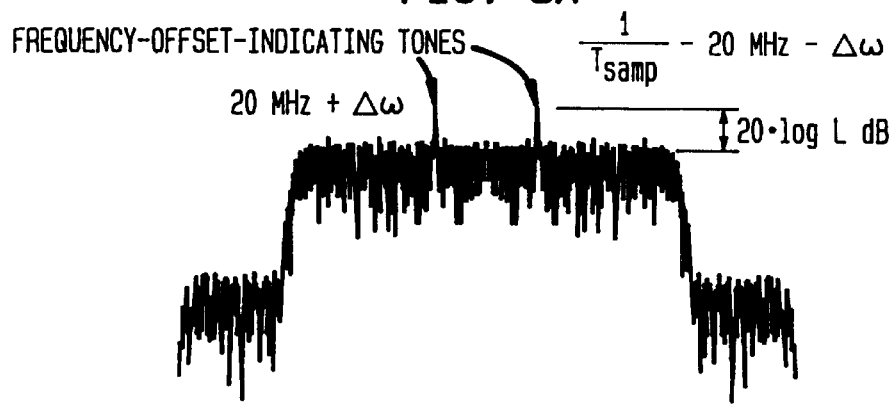
FIGS. 5(a), (b) shows the power spectra of the correlator output and related channel impulse response for passband signals with nonzero frequency offset.
Figure 5B:

The correlator output has a frequency response that is the multiplication of the responses of the training sequence PN and the correlator sequence $PN^{-1}$. If the frequency offset is zero, as depicted in FIGS. 4(a) and 4(b), the correlator output has a frequency response with an ideal flat shape at the sampling points. On the other hand, if the sounding signal is impaired by a nonzero frequency offset $\Delta\omega$, this offset causes the frequency response of the PN sequences to be shifted by $\Delta\omega$. Assuming that $\Delta\omega=(k/127)\cdot 20$ MHz for some integer k, the frequency response of the PN sequences multiplied by that of the modified PN sequence, yields a totally flat response at every sampling points, except for a peak tone showing up at the frequency $(k/127)\cdot 20$ MHz, for some integer k. The power spectrums of the correlator output and its related channel impulse response of a nonzero frequency offset case are shown in FIG. 5 where two frequency-offset-indicating tones can be observed. The locations of those frequency-offset-indicating tones are $20+\Delta\omega$ and $1/T_{samp}-20-\Delta\omega$ MHz, respectively, which provide information about the unknown frequency $\Delta\omega$. Also, there is a 20·log L dB gain occurs at the locations of those frequency-offset-indicating tones, as compared to the rest sampling points.

Figure 6A:
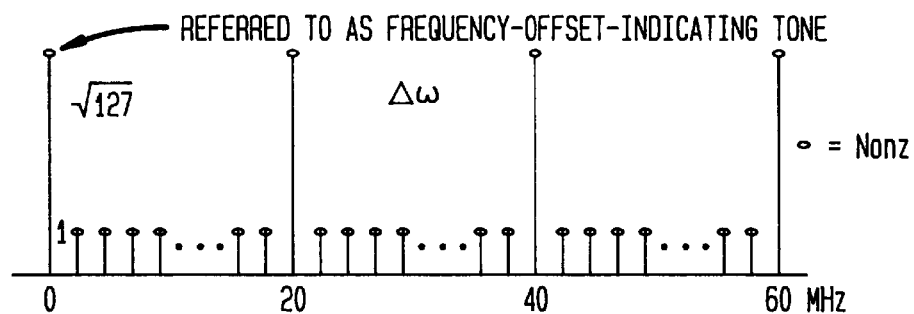
FIGS. 6(a), (b) shows the frequency response of pseudo-random and modified pseudo-random sequences.
Figure 6B:
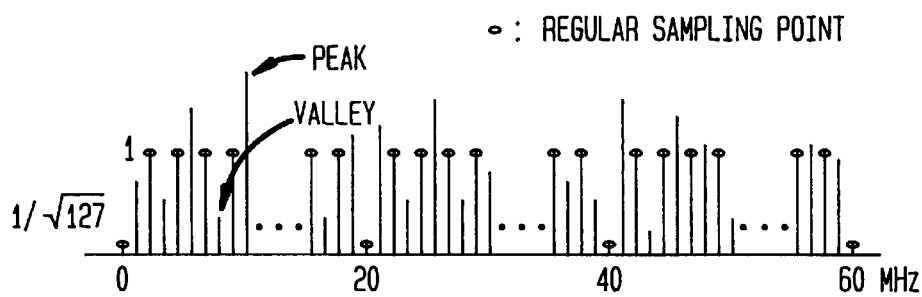

In the following example, we will increase the resolution of the DFT by increasing the value of N to 6×127, and confine the frequency within 60 MHz. For simplicity, we assume that the input PN sequence is repeated continuously. The 127 PN sequence with two zeros inserted between any two consecutive symbols is repeated once to form the input to the DFT. On the other hand, since modified PN sequence is only a single copy of 127 symbols, we insert two zeros between any two consecutive symbols to result in the first 3×127 samples. We also include 3×127 zeros at the end to form a total of 6×127 points for taking the DFT. FIG. 6(a) shows the frequency response of the PN sequence, where there are sampling points having a density of one and four points with a density of $\sqrt{127}$ at 0 MHz, 20 MHz, 40 MHz and 60 MHz, which we refer to as frequency-offset-indicating tones. In fact, there are also sampling points of a zero density between any two consecutive sampling points. FIG. 6(b) shows the frequency response of the modified PN sequence where there are sampling points of a density of one and four points with a density of $1/\sqrt{127}$ at 0 MHz, 20 MHz, 40 MHz and 60 MHz. Unlike the PN sequence, the modified PN sequence is a single copy of 127 symbols and thus its frequency response also shows some irregular peaks and valleys between any two consecutive sampling points of a density of 1 or $1/\sqrt{127}$. As value of N increases, the size of the ripple remains the same but the oscillations become more rapid. If the value of frequency offset is not exactly equal to $(k/127)\cdot 20$ MHz for some integer k, the frequency response of PN sequence may be multiplied with some valleys in the frequency response of modified PN sequence. Thus, we may not observe the frequency-offset-indicating tone at the correlator output frequency response.

Figure 7A:
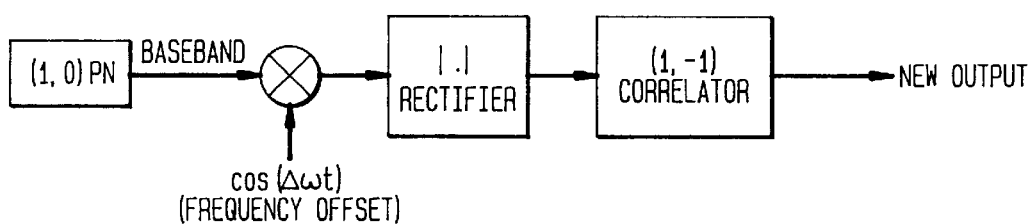

It may seem that only frequency offset of a value equals to $(k/127)\cdot 20$ MHz can be detected. Nevertheless, with some effort to be discussed later in this paper, we show it is also possible to estimate frequency offset of an arbitrary value. Before any frequency estimate can be performed, we need to find a way to synchronize signal at the receiver in the presence of a frequency offset. Since a passband signal can be mathematically treated in its baseband equivalent form, for simplicity in the demonstration of our proposed concepts, we will only investigate the baseband case. The same concept is also applicable to the passband case. In FIG. 7(a), we first show baseband PN sequences modified by an unknown frequency offset $\Delta\omega$, a rectifier and a correlator. This rectifier is used to take the absolute value of the incoming signal and pass the signal through the correlator to create new output samples.

Figure 7B:
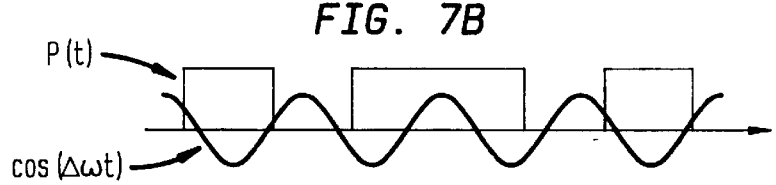
FIGS. 7(b) and 7(c) show waveform effects of the unrectified and rectified signal.

In FIG. 7(b), we show the baseband PN signal and the undesirable influence of a frequency offset $\cos(\Delta\omega t)$ in time domain, respectively. The PN signal with a frequency offset processed by a rectifier yields $|\cos(\Delta\omega t)\cdot P(t)|$. Since the PN sequence only has non-negative values, the signal after the rectifier can be represented as:

$$|\cos(\Delta\omega t)\cdot P(t)|=|\cos(\Delta\omega t)|\cdot P(t) \qquad (Eq. 18)$$

Figure 7C:
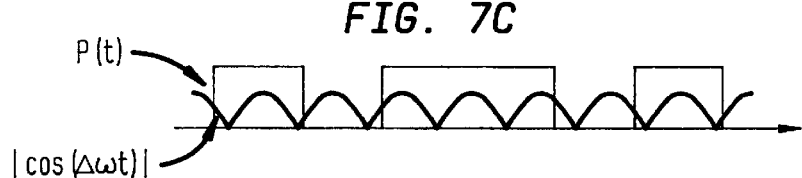

FIG. 7(c) shows the PN signal and the rectified frequency offset, respectively. Based on the Fourier Series Expansion, Eq. 18 can be approximated as follows:

$$|\cos(\Delta\omega t)|\approx (2/\pi)\cdot [1+K\cdot \cos(2\cdot \Delta\omega t)] \qquad (Eq. 19)$$

where $K=\frac{1}{3}$. Therefore, the correlator output is given by:

$$(|\cos(\Delta\omega t)|\cdot P(t))\otimes P^{-1}(t)\approx$$
$$(2/\pi)\cdot [P(t)\otimes P^{-1}(t)+(K\cdot \cos(2\cdot \Delta\omega t)\cdot P(t))\otimes P^{-1}(t)] \qquad (Eq. 20)$$

Figure 8A:
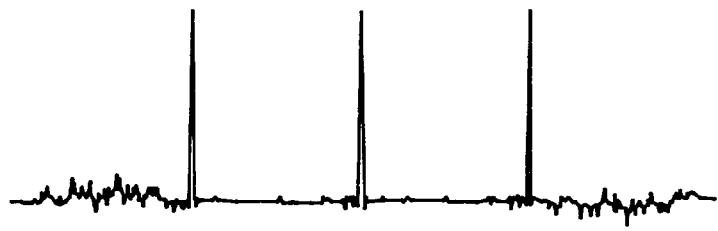
FIGS. 8(a), (b) shows the correlator output for baseband signal with varying degrees of frequency offset using the circuitry of FIG. 7(a)
Figure 8B:

The first term in Eq. 20 yields the channel impulse response (no frequency offset) and the second term yields the channel impulse response that is affected by an unknown frequency offset $\Delta\omega$. Examples of the correlator outputs with various frequency offsets is represented in FIG. 8. As shown in FIGS. 8(b) and (c) with nonzero frequency offset, the outputs of the correlator have three strong peaks in time domain and noise-like background due to the second term in Eq. 20. The three distinguished peaks can be used for synchronization since the noise-like background is small compare to the three peaks. Since the noise-like background between any two peaks are small, their information can also be taken advantage of to obtain a more reliable synchronization than just use the information of the three periodic strong peaks.

Figure 9A:
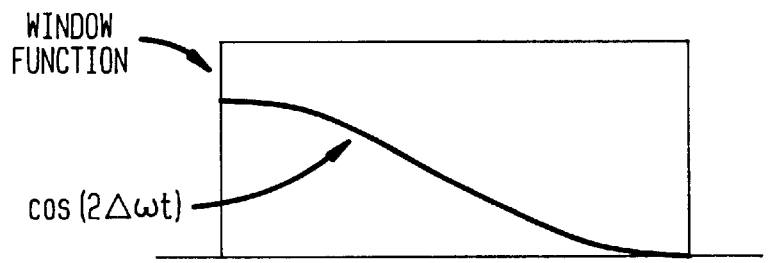
FIGS. 9(a) and 9(b) show small and large numbers of half cycles of the offset frequency in a window function referred to the pseudo-random sequence.
Figure 9B:
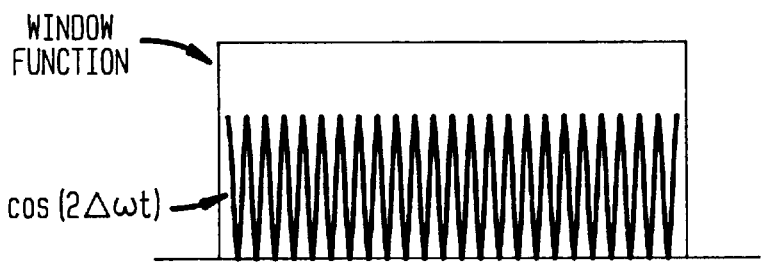

It is appropriate to discuss how the value of frequency offset affects synchronization and frequency offset detection. The approximations (Eqs. 19 and 20) holds only if we assume cosine function is defined from $-\infty$ to $\infty$. However, the duration of a PN sequence is finite, limited to L symbols, and thus the cosine wave used in Eq. 18 is truncated by a window function $\Pi(L)$. If this condition is severely violated (when impaired by a small frequency offset) due to truncation of the cosine wave by the window function, as shown in FIG. 9(a), the second term of Eq. 20 is not approximated properly. Thus, it becomes more difficult to detect the frequency offset. To ensure the accuracy of frequency offset estimate, the cosine wave should have enough cycles in the window function, as shown in FIG. 9(b). FIG. 8(b) shows that with a small frequency offset it is good for synchronization but frequency offset estimate may not be possible.

Figure 8C:
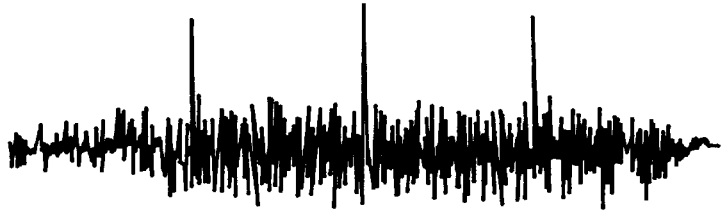

If frequency offset is large, the value of K can be more precisely approximated and thus, the second term in Eq. 20, the noise-like background, is better defined. Since we know the relationship between the magnitude of those strong peaks and envelope of the noise-like background, we can apply thresholds (for example, a high threshold to detect the periodic strong peaks and a low threshold to detect the noise-like background) during the detecting process to get a more reliable synchronization. In FIG. 8(c) with large frequency offset, the envelope of the noise-like background is approximately $\frac{1}{3}$ times lower than the magnitude of the strong peaks.

Figure 10:
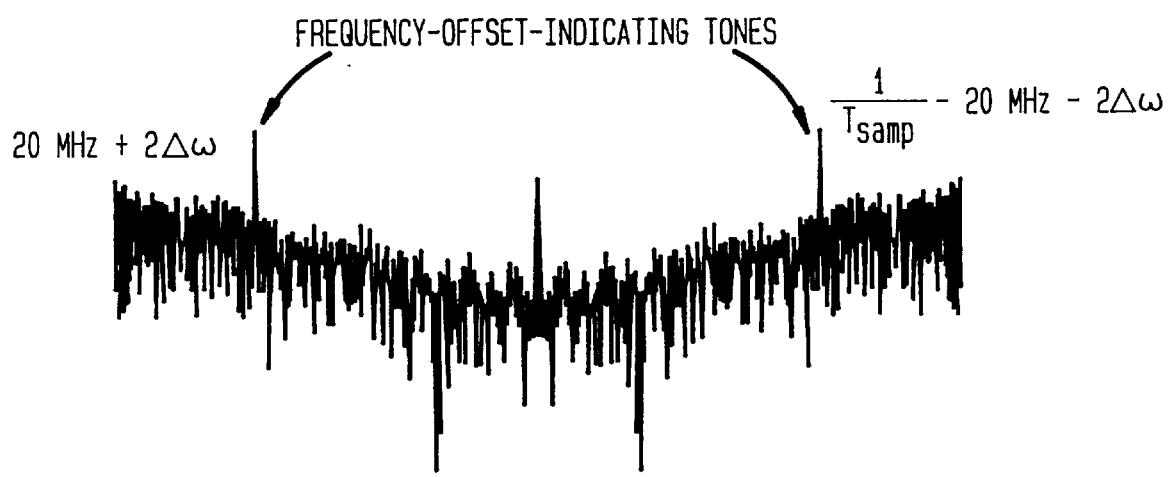
FIG. 10 shows the power spectrum of the correlator output for baseband signals with large frequency offset.

As shown in FIG. 10, two frequency-offset-indicating tones can be observed in the power spectrum of correlator output. These frequency-offset-indicating tones occur at the value of frequency that shifted by 2Δω, with respect to the 20 MHz symbol rate and its alias component $$\frac{1}{T_{samp}} - 20 \text{ MHz}.$$

Thus, we can estimate the frequency offset according to the location of those frequency-offset-indicating tones. Thus it is seen that, despite a large frequency offset, reliable sounding/synchronization at the receiver side can be obtained and a good estimation can be made of the frequency-offset-indicating tones in the power spectrum of the correlator output. A dithering process which overcomes the problems of detecting an extremely small frequency offset will now be discussed.

Dithering Process for Frequency Offset Estimation

In this section, a dithering process is introduced to guarantee a successful detection of frequency-offset-indicating tones, even if the frequency offset is extremely small.

Figure 11:
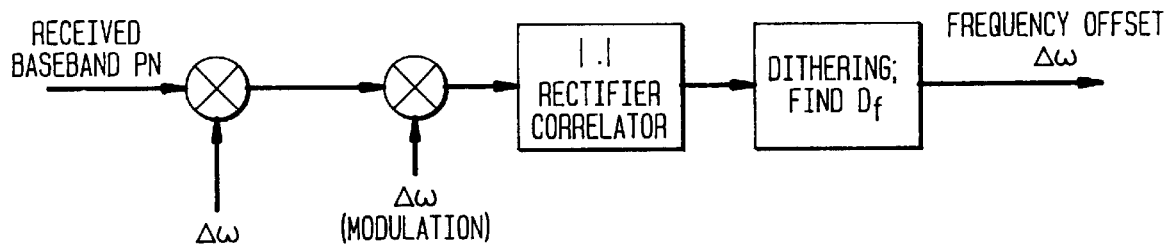
FIG. 11 is a block diagram of a circuit for frequency offset estimation dithering.

As mentioned above, even with a rectifier, it is possible that the frequency of the frequency-offset-indicating tones can occur at the location where the correlator frequency response has a valley, as shown in FIG. 6(b). And thus, the frequency-offset-indicating tones may become undetectable. To resolve this problem, the incoming signal is first modulated by a known large frequency $\overline{\Delta\omega}$ to make sure that the overall frequency offset occurs around a frequency that is an integral multiple of 20/N MHz, where N is the length of a PN sequence (in our example N=127). This guarantees that the overall frequency offset is around a desirable location that is favorable for detection. To guarantee precise detection, we further engage a dithering procedure which purposely adds a small known frequency offset $D_f$ to the signal. By gradually changing $D_f$, we can guarantee to search for the frequency-offset-indicating tones. The detail procedure is shown in FIG. 11. In other word, we apply a linear transformation function to the frequency offset Δω to ensure the occurrence of the frequency-offset-indicating tone at one of the sampling points, (k/127)·20 MHz, for some integer k. This transformation can be denoted by $$\Delta W = \Delta\omega + \overline{\Delta\omega} + D_f \quad \text{(Eq. 21)}$$

where ΔW=(k/127)·20 MHz, for some integer k, is the overall frequency that represents the location of the frequency-offset-indicating tone, $\overline{\Delta\omega}$ is a large known frequency that modulates the incoming signal and $D_f$ is the dithering frequency. The convergence of dithering process will be determined by how fast the proper value of $D_f$ can be found.

Detailed Procedure for Frequency Offset Correction

Figure 12:
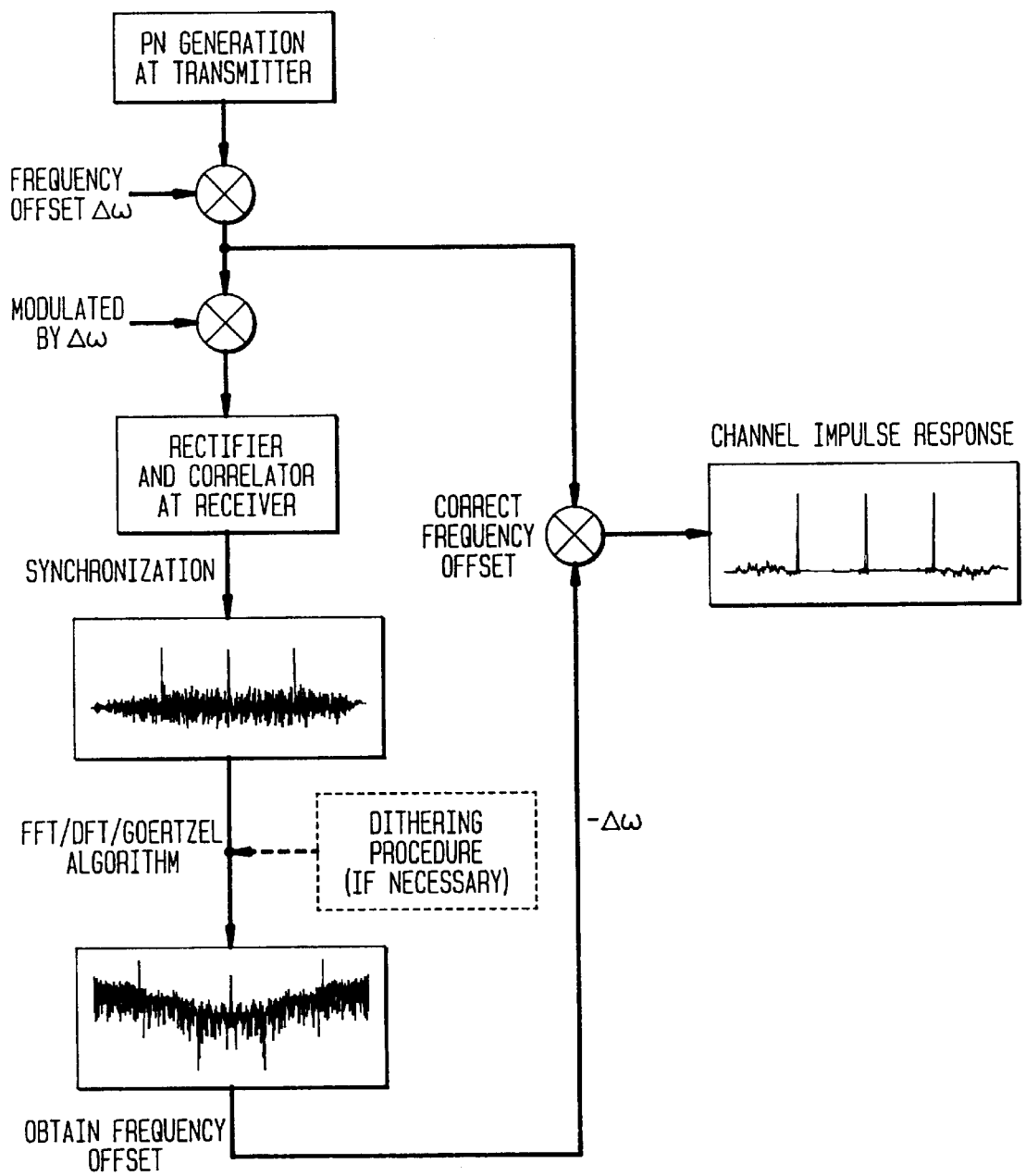
FIG. 12 is a flow chart of the procedure for frequency offset correction.

FIG. 12 summarizes steps needed for synchronization, frequency offset estimate, and channel impulse response sounding. A signal with a unknown frequency offset Δω is first received. The signal is then modulated by another known offset $\overline{\Delta\omega}$. The modulated signal is further processed by a rectifier and a correlator. The output in time domain, as discussed before, has strong peaks and somewhat quiet zones between peaks that can be used for synchronization detection. Once synchronized, the signal is dithered and processed by DFT, FFT (Fast Fourier Transform) or Goertzel algorithm in order to detect the frequency-offset-indicating tone associated with an unknown frequency offset. Then, we use the estimated frequency offset to compensate for the frequency offset in the received signal for a properly sounding of the channel impulse response.

What has been described is deemed to be illustrative of the principles of the invention. Further and other modifications will be apparent to those skilled in the art without, however, departing from the spirit and scope of our invention.

What is claimed is:

1. A method of achieving symbol rate synchronization incident to ascertaining a channel's impulse response, comprising the steps of:
    a) receiving over said channel signals containing a training sequence of known, pseudo random binary symbols (PN);
    b) correlating said sequence received over said channel with a sequence ($PN^{-1}$) modified by mapping the zeros of said known sequence (PN) to −1; and
    c) taking a transform of the received correlated signals to obtain tones indicative of the amount of offset in synchronization.

2. A method according to claim 1, wherein: said signals received over said channel include an odd plurality of training sequences of said pseudo random binary symbols which are correlated with a single copy of said modified sequence.

3. A method according to claim 2, wherein: said synchronization is corrected in accordance with the amount of offset indicated by said tones.

4. A method according to claim 3, wherein: said correlating is corrected after said synchronization is corrected.

5. A method according to claim 1, wherein: said received signals are rectified; and wherein said correlating of said sequence is performed with said rectified signals.

6. A method according to claim 1, wherein: said signals are modulated by a known offset frequency; said modulated signals are rectified; and said correlating of said sequence is performed with said rectified modulated signals.

7. A method according to claim 6 wherein said known offset frequency occurs around a frequency that is an integral multiple of 20/N MHz, where N is the length of said training sequence.

8. A method according to claim 2 wherein said transform is a discrete Fourier transform.

9. A method according to claim 2 wherein said transform is a fast Fourier transform.

10. A method according to claim 2 wherein said transform is a Goertzel algorithm.

11. A method according to claim 2 wherein said signals are sampled at a predetermined sampling frequency ($1/T_{samp}$) and wherein one of said offset-frequency indicating tones is located at the symbol rate frequency plus the off-set-frequency and another of said offset-frequency indicating tones is located at the difference between said sampling frequency and said symbol frequency minus said off-set frequency.

12. A method according to claim 2 wherein said offset-frequency indicating tones have an amplitude approaching $\sqrt{N}$ times the amplitude of the background noise, where N is the number of symbols in the training sequence.

13. A method of achieving symbol rate synchronization according to claim 2, wherein:
    a) said received sequence is modulated by a known frequency offset;
    b) said modulated sequence is rectified to obtain the absolute value thereof;
    c) said correlating is performed with said absolute value of said modulated sequence to obtain tones indicating the lack of synchronization; and d) correcting said synchronization in accordance with said tones.

14. A method of ascertaining a channel's impulse response in the presence of an unknown amount of frequency offset between the rate of sampling the received symbols and the symbol rate, comprising the steps of:
   a) receiving a known pseudo random binary sequence PN of symbols over said channel;
   b) modulating the received signal by a known frequency offset;
   c) sampling said received sequence at a multiple of said symbol rate;
   d) rectifying the received signal;
   e) correlating said received sequence with a modified pseudo random binary sequence $PN^{-1}$ in which the zeros of said known sequence have been mapped to B1;
   f) taking a transform of the received correlated signal to produce an output;
   g) detecting frequency-offset-indicating tones in said output; and
   h) employing said tones to synchronize the receiving of said symbols with said symbol.

* * * * *